US009082415B2

(12) United States Patent
Hayakawa

(10) Patent No.: US 9,082,415 B2
(45) Date of Patent: Jul. 14, 2015

(54) SOUND DETERMINATION METHOD AND SOUND DETERMINATION APPARATUS

(75) Inventor: Shoji Hayakawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1731 days.

(21) Appl. No.: 11/987,061

(22) Filed: Nov. 27, 2007

(65) Prior Publication Data

US 2008/0181058 A1 Jul. 31, 2008

(30) Foreign Application Priority Data

Jan. 30, 2007 (JP) ................................ 2007-019917

(51) Int. Cl.

*G06F 15/00* (2006.01)
*G10L 21/00* (2013.01)
*G10L 25/78* (2013.01)
*G10L 21/0208* (2013.01)
*G10L 25/48* (2013.01)
*G10L 25/27* (2013.01)
*G10L 21/0216* (2013.01)

(52) U.S. Cl.

CPC ............ *G10L 25/78* (2013.01); *G10L 21/0208* (2013.01); *G10L 25/48* (2013.01); *G10L 25/27* (2013.01); *G10L 2021/02166* (2013.01)

(58) Field of Classification Search

CPC .................... G10L 2021/02166; G10L 25/78; G01S 3/8083

See application file for complete search history.

(56) References Cited

U.S. PATENT DOCUMENTS 4,333,170 A 6/1982 Mathews
6,243,322 B1 6/2001 Zakarauskas
7,221,622 B2 5/2007 Matsuo et al.

(Continued)

FOREIGN PATENT DOCUMENTS

EP 0 831 458 A2 3/1998
EP 1 450 354 8/2004

(Continued)

OTHER PUBLICATIONS

Yoshifumi Nagata, Toyota Fujioka, and Masato Abe, "Target Signal Detection System Using Two Directional Microphones,"The IEICE Transactions on Fundamentals of Electronics, Communications and Computer Sciences (Japanese edition). A, vol. J83-A No. 12, pp. 1445 to 1454. English Abstract.

(Continued)

*Primary Examiner* — Angela A Armstrong

(74) *Attorney, Agent, or Firm* — Kratz, Quintos & Hanson, LLP

(57) ABSTRACT

A sound determination apparatus receives acoustic signals by a plurality of sound receiving units, and generates frames having a predetermined time length. The sound determination apparatus performs FFT on the acoustic signals in frame units, and converts the acoustic signals to a phase spectrum and amplitude spectrum, which are signals on a frequency axis, then calculates the difference at each frequency between the respective acoustic signals as a phase difference, and selects frequencies to be the target of processing. The sound determination apparatus calculates the percentage of frequencies at which the absolute values of the phase differences of the selected frequencies are equal to or greater than a first threshold value, and determines that the acoustic signal coming from the nearest sound source is included in the frame when the calculated percentage is equal to or less than a second threshold value.

17 Claims, 12 Drawing Sheets

(56) References Cited

U.S. PATENT DOCUMENTS

| | | | |
|---|---|---|---|
| 2003/0138116 A1 | 7/2003 | Jones et al. | |
| 2005/0129255 A1 * | 6/2005 | Yoshino | 381/96 |

FOREIGN PATENT DOCUMENTS

| | | | |
|---|---|---|---|
| EP | 1450354 | A1 * | 8/2004 |
| EP | 1 701 587 | | 9/2006 |
| JP | 63-502144 | A | 8/1988 |
| JP | 5-64290 | | 3/1993 |
| JP | 2003-514412 | A | 4/2003 |
| JP | 2004-4286 | A | 1/2004 |
| JP | 2004-226656 | | 8/2004 |
| JP | 2005-49153 | A | 2/2005 |
| JP | 2006-84928 | A | 3/2006 |
| JP | 2006-194959 | A | 7/2006 |
| WO | WO 87/03995 | A1 | 7/1987 |
| WO | WO 01-35118 | A1 | 5/2001 |

OTHER PUBLICATIONS

Office Action dated Jun. 28, 2011 corresponding to Japanese Patent Application No. 2007-019917 with Certification and English language translation.
S. Furui; "Digital Voice Processing;" Tokai University Press; Sep. 1985; p. 18 (1 Sheet.).
Luca Armani et al., "Use of a CSP-based voice activity detector for distant-talking ASR," *Eurospeech-2003*, pp. 501-504.
Le Bouquin-Jeannes R. et al., "Study of a voice activity detector and its influence on a noise reduction system," *Speech Communication*, Apr. 1995, vol. 16, No. 3, pp. 245-254.
Extended European Search Report issued for corresponding European Patent Application No. 07121944.8 dated Nov. 22, 2011.

* cited by examiner

SOUND DETERMINATION METHOD AND SOUND DETERMINATION APPARATUS

CROSS-REFERENCE TO RELATED APPLICATION

This Nonprovisional application claims priority under 35 U.S.C. §119(a) on Patent Application No. 2007-19917 filed in Japan on Jan. 30, 2007, the entire contents of which are hereby incorporated by reference.

BACKGROUND OF THE INVENTION

This invention relates to a sound determination method and sound determination apparatus which, based on acoustic signals that are received from a plurality of sound sources by a plurality of sound receivers, determines whether or not there is a specified acoustic signal, and more particularly to a sound determination method and sound determination apparatus for identifying the acoustic signal from the nearest sound source from a sound receiver.

With the current advancement of computer technology, it has become possible to execute processing at practical processing speed even for acoustic signal processing that requires a large quantity of operation processing. Because of this, it is anticipated that multi-channel acoustic signal processing functions using a plurality of microphones become practical. As an example of this, is noise suppression technology. In noise suppression technology, sound from a target sound source, for example the nearest sound source, is identified, and by an operation such as delay-sum beamforming or null beamforming using the incident angle or the arrival time difference of the sound to each microphone that is determined from the incident angle as a variable, the sound from an identified sound source is emphasized, and by suppressing the sound from sound sources other than the identified sound source, the target sound is emphasized and other sounds are suppressed. Also, when the nearby sound source that is the target is moving, the power distribution is typically found using delay-sum beamforming with the incident angle as a variable, and from that power distribution, the sound source is estimated to be located at the angle having the largest power, so the sound coming from that angle is emphasized, and sound coming from angles other than that angle is suppressed.

Also, when a sound is not continuously emitted from the nearby target sound source, the ratio or difference between the power of the estimated ambient noise and the current power is typically used to detect the time interval at which sound is emitted from the nearby target sound source.

Furthermore, in U.S. Pat. No. 6,243,322, a method is disclosed that uses the ratio between the peak value of the power distribution that is found using delay-sum processing (used for delay-sum processing) with the incident angle as a variable and the value at other angles in order to determine whether the incident sound is from the nearby target sound source or from a long distance sound source.

BRIEF SUMMARY OF THE INVENTION

However, in an environment in which there is an occurrence of noise such as ambient noise or non-stationary noise, the power distribution that is found through delay-sum processing (used for delay-sum beamforming) using the incident angle as a variable has a problem in that a plurality of peaks appear or the peaks become broad, so it becomes difficult to identify the nearby target sound source.

Also, when sound from the nearby target sound source is not emitted continuously at a constant intensity, the peak of the power distribution becomes dull due to the ambient noise, so there is a problem in that it becomes even more difficult to detect the time interval at which the sound coming from the target sound source is emitted.

Furthermore, in the method disclosed in U.S. Pat. No. 6,243,322, all frequency bands are used, including bands having a poor S/N ratio, so in a loud environment there is a problem in that the peak at the angle from which the sound from the nearby sound source comes becomes dull, and thus it is difficult to accurately determine the sound that comes from the nearby sound source.

Taking the aforementioned problems into consideration, it is the main object of the present invention to provide: a sound determination method that is capable of easily identifying the occurrence interval of the sound coming from a target sound source even in a loud environment by calculating the phase difference spectrum of acoustic signals that are received by a plurality of microphones, and determining that the acoustic signal coming from the nearest sound source that is the target of identification is included when the calculated phase difference is equal to or less than a specified threshold value; and a sound determination apparatus which employs that sound determination method.

Moreover, another object of the present invention is to provide a sound determination method and apparatus thereof which improve the accuracy of identifying the occurrence interval of sound coming from a target sound source by determining that the acoustic signal from the target sound source is not included when the S/N ratio is equal to or less than a predetermined threshold value.

Furthermore, another object of the present invention is to provide a sound determination method and apparatus thereof which improve the accuracy of determining the occurrence interval of sound coming from a target sound source by sorting frequencies that are used for determination according to factors such as the S/N ratio, ambient noise, filter characteristics, sound characteristics, etc.

The sound determination method of a first aspect is a sound determination method using a sound determination apparatus which determines whether or not there is a specified acoustic signal based on analog acoustic signals received by a plurality of sound receiving means from a plurality of sound sources, wherein the sound determination apparatus converts respective acoustic signals that are received by the respective sound receiving means to digital signals; converts the respective acoustic signals that are converted to digital signals to signals on a frequency axis; calculates a phase difference at each frequency between the respective acoustic signals that are converted to signals on the frequency axis; determines that an acoustic signal received by the sound receiving means from the nearest sound source is included when the calculated phase difference is equal to or less than a predetermined threshold value; and performs output based on the result of the determination.

The sound determination apparatus of a second aspect is a sound determination apparatus which determines whether or not there is a specified acoustic signal based on analog acoustic signals received by a plurality of sound receiving means from a plurality of sound sources, and comprises: means for converting respective acoustic signals that are received by the respective sound receiving means to digital signals; means for converting the respective acoustic signals that are converted to digital signals to signals on a frequency axis; means for calculating a difference in the phase component at each frequency between the respective acoustic signals that are converted to signals on the frequency axis as a phase difference; determination means for determining that a specified target acoustic signal is included when the calculated phase difference is equal to or less than a predetermined threshold value; and means for performing output based on the result of the determination.

The sound determination apparatus of a third aspect is a sound determination apparatus which determines whether or not there is an acoustic signal that is received by sound receiving means from the nearest sound source based on analog acoustic signals received by a plurality of sound receiving means from a plurality of sound sources, and comprises: means for converting respective acoustic signals that are received by the respective sound receiving means to digital signals; means for generating frames having a predetermined time length from the respective acoustic signals that are converted to digital signals; means for converting the respective acoustic signals in units of the generated frames into signals on a frequency axis; means for calculating a difference in the phase component at each frequency between the respective acoustic signals that are converted to signals on the frequency axis as a phase difference; and determination means for determining that an acoustic signal coming from the nearest sound source is included in a generated frame when the percentage or number of frequencies for which the calculated phase difference is equal to or greater than a first threshold value is equal to or less than a second threshold value.

The sound determination apparatus of a fourth aspect is the sound determination apparatus of the second or third aspect, and further comprises means for calculating a signal to noise ratio based on the amplitude component of the acoustic signals that are converted to signals on the frequency axis; wherein the determination means determines that the specified target acoustic signal is not included regardless of the phase difference when the calculated signal to noise ratio is equal to or less than a predetermined threshold value.

The sound determination apparatus of a fifth aspect is the sound determination apparatus of any one of the second to fourth aspects, wherein the plurality of sound receiving means are constructed so that the relative position between them can be changed; and further comprises means for calculating the threshold value to be used in the determination by the determination means based on the distance between the plurality of sound receiving means.

The sound determination apparatus of a sixth aspect is the sound determination apparatus of any one of the second to fifth aspects, and further comprises selection means for selecting frequencies to be used in the determination by the determination means based on the signal to noise ratio at each frequency that is based on the amplitude component of the acoustic signals that are converted to signals on the frequency axis.

The sound determination apparatus of a seventh aspect is the sound determination apparatus of the sixth aspect, and further comprises means for calculating the second threshold value based on the number of frequencies that are selected by the selection means when the determination means performs determination based on the number of frequencies at which the phase difference is equal to or greater than the first threshold value.

The sound determination apparatus of an eighth aspect is the sound determination apparatus of any one of the second to seventh aspects, and further comprises an anti-aliasing filter which filters out acoustic signals before conversion to digital signals in order to prevent occurrence of aliasing error; wherein the determination means eliminates frequencies that are higher than a predetermined frequency that is based on the characteristics of the anti-aliasing filter from the frequencies to be used in determination.

The sound determination apparatus of a ninth aspect is the sound determination apparatus of any one of the second to eighth aspects, and further comprises means for, when specifying an acoustic signal that is a voice, detecting the frequencies at which the amplitude component of the acoustic signals that are converted to signals on the frequency axis have a local minimum value, or the frequencies at which the signal to noise ratios based on the amplitude component have a local minimum value; wherein the determination means eliminates the detected frequencies from the frequencies used in determination.

The sound determination apparatus of a tenth aspect is the sound determination apparatus of any one of the second to ninth aspects, wherein when specifying an acoustic signal that is a voice, the determination means eliminates frequencies at which the fundamental frequency (pitch) for voices does not exist from frequencies to be used in determination.

In the first, second and third aspects, a plurality of sound receiving means such as microphones, convert respective received acoustic signals to signals on a frequency axis, calculate the phase difference of the respective acoustic signals, and determine that the acoustic signal coming from the target nearest sound source is included when the calculated phase difference is equal to or less than the predetermined threshold value. It is difficult for the acoustic signal from the target nearest sound source to be mixed in as a reflected sound or diffracted sound and the variance of phase difference becomes small, so when the most of the phase difference are equal to or less than the predetermined threshold value, it is possible to determine that the acoustic signal coming from the target sound source is included. Also, since the phase difference for a long distance noise such as ambient noise is large, it is possible to easily identify the interval at with the acoustic signal coming from the target sound source occurs even in a loud environment.

When receiving acoustic signals coming from a plurality of sound sources, generally, the longer the distance is between the sound source and the sound receiving means is, the easier it is for reflected sound that reflects off of objects such as walls before arriving at the sound receiving means and diffracted sound that is diffracted before arriving at the sound receiving means to be mixed in with direct sound that arrives at the sound receiving means directly from the sound source. Compared to direct sound, the paths traveled by reflected sound and diffracted sound before arriving are long, so when acoustic signals in which reflected sound and diffracted sound are mixed in are converted to signals on a frequency axis, the signals arrive at various incident angles due to the paths, so the value of the phase difference spectrum is not stable and variation becomes large. Also, when the target sound source is the nearest sound source, it is difficult for reflected sound and diffracted sound to mix in with the acoustic signal from the nearest sound source, and the phase difference spectrum becomes a straight line with little variation. Therefore, in this invention, using the construction described above, it is possible to determine that the acoustic signal from the target sound source is included when the phase difference is equal to or less than the predetermined threshold value, and since the phase difference for the noise from a long distance such as ambient noise is large, it is possible to easily identify acoustic signals from the target sound source even in a loud environment, and it is possible to suppress noise.

In the fourth aspect, it is determined that the acoustic signal from the target sound source is not included regardless of the phase difference when the signal to noise ratio (S/N ratio) is equal to or less than the predetermined threshold value. For example, it is possible to avoid mistakes in determination even when the phase difference of ambient noise just happens to be proper, so the accuracy of identifying the acoustic signal can be improved.

In the fifth aspect, the threshold value changes dynamically when it is possible to change the relative position between the sound receiving means. By calculating the threshold value and dynamically changing the setting to the calculated threshold value based on the distance between the sound receiving means, it is possible to constantly optimize the threshold value and to improve the accuracy of identifying the acoustic signal from the target sound source even when construction is such that the relative position between sound receiving means can change.

In the sixth aspect, determination is performed after eliminating frequency bands having a low signal to noise ratio. By eliminating frequency bands having a low signal to noise ratio it is possible to improve the accuracy of identifying the acoustic signal from the target sound source.

In the seventh aspect, the second threshold value is calculated based on the number of selected frequencies by the selection means in the sixth aspect when performing determination based on the number of frequencies at which the phase difference is equal to or greater than the first threshold value. The second threshold value is not a constant number, but is a variable that changes based on the number of selected frequencies.

In the eighth aspect, when the effect of the anti-aliasing filter that prevents aliasing error in acoustic signals that are converted to digital signals appears as distortion on the phase difference spectrum, for example when performing sampling at a sampling frequency of 8000 Hz, determination is performed by eliminating frequency bands of 3300 Hz or greater.

In the ninth aspect, when identifying an acoustic signal that is a voice, taking into consideration the characteristics of a voice at frequencies for which the amplitude component have a local minimum value and for which the phase difference becomes easily disturbed, those frequencies are eliminated from determination. This makes it possible to improve the accuracy of identifying the acoustic signal from the target sound source.

In the tenth aspect, when identifying an acoustic signal that is a voice, sound determination is performed after eliminating frequency bands that are equal to or less than a fundamental frequency at which the voice spectrum does not exist according to the frequency characteristics of a voice. This makes it possible to improve the accuracy of identifying the acoustic signal from the target sound source.

The above and further objects and features of the invention will more fully be apparent from the following detailed description with accompanying drawings.

DETAILED DESCRIPTION OF THE INVENTION

The preferred embodiments of the invention will be described below based on the drawings. In the embodiments described below, the acoustic signal that is the target of processing is mainly a person's spoken voice.

First Embodiment

Figure 1:
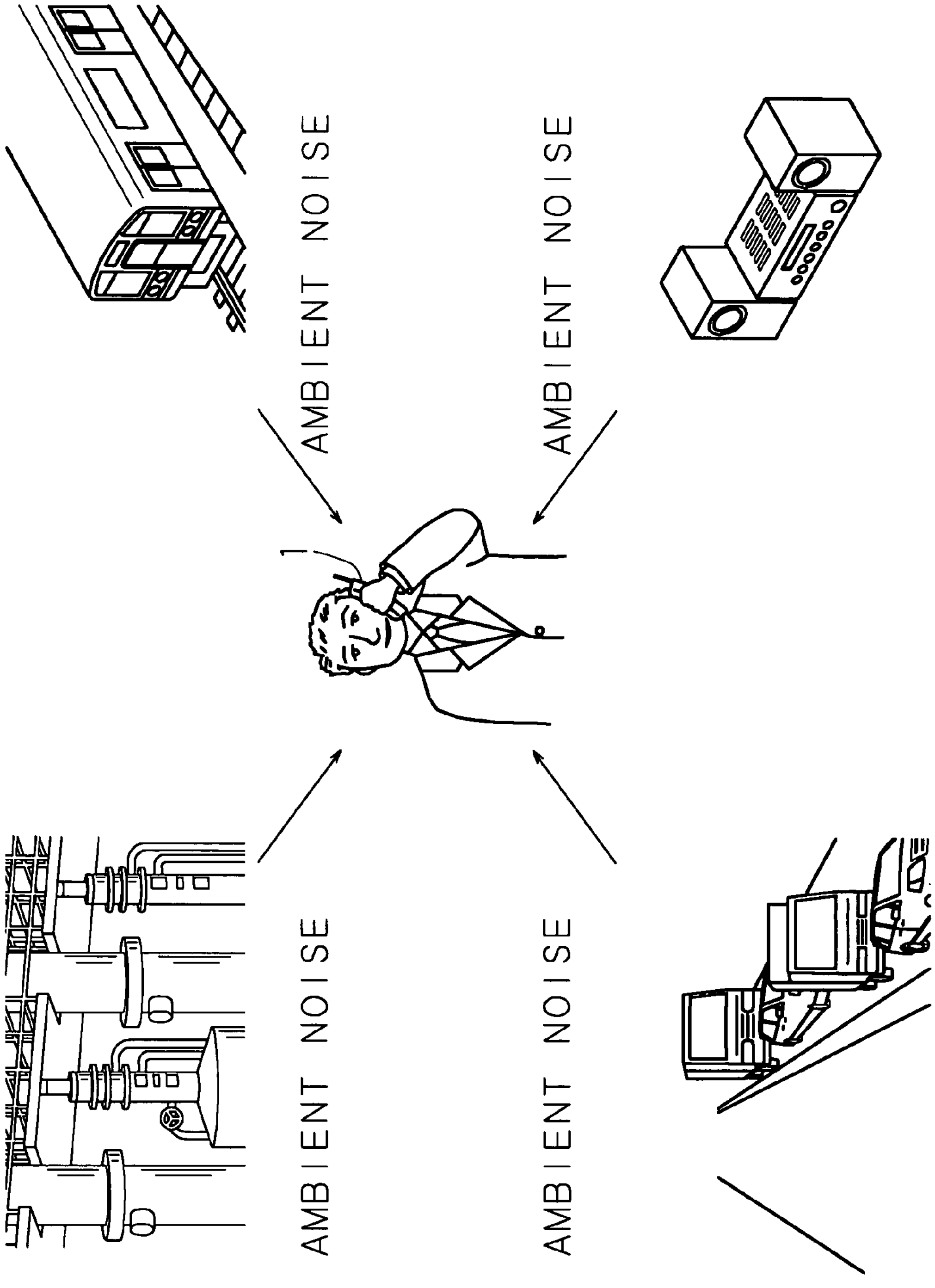
FIG. 1 is a drawing showing an example of the sound determination method of a first embodiment.

FIG. 1 is a drawing showing an example of the sound determination method of the first embodiment of the invention. In FIG. 1, the reference number 1 is a sound determination apparatus which is applied to a mobile telephone, and the sound determination apparatus 1 is carried by the user and receives the voice spoken by the user as an acoustic signal. Moreover, in addition to the voice of the user, the sound determination apparatus 1 receives various ambient noises such as voices of other people, machine noise, music and the like. Therefore, the sound determination apparatus 1 performs processing for suppressing noise by identifying the target acoustic signal from among the various acoustic signals that are received from a plurality of sound sources, then emphasizing the identified acoustic signal, and suppressing the other acoustic signals. The target acoustic signal of the sound determination apparatus 1 is the acoustic signal coming from the sound source that is nearest to the sound determination apparatus 1, or in other words, is the voice of the user.

Figure 2:
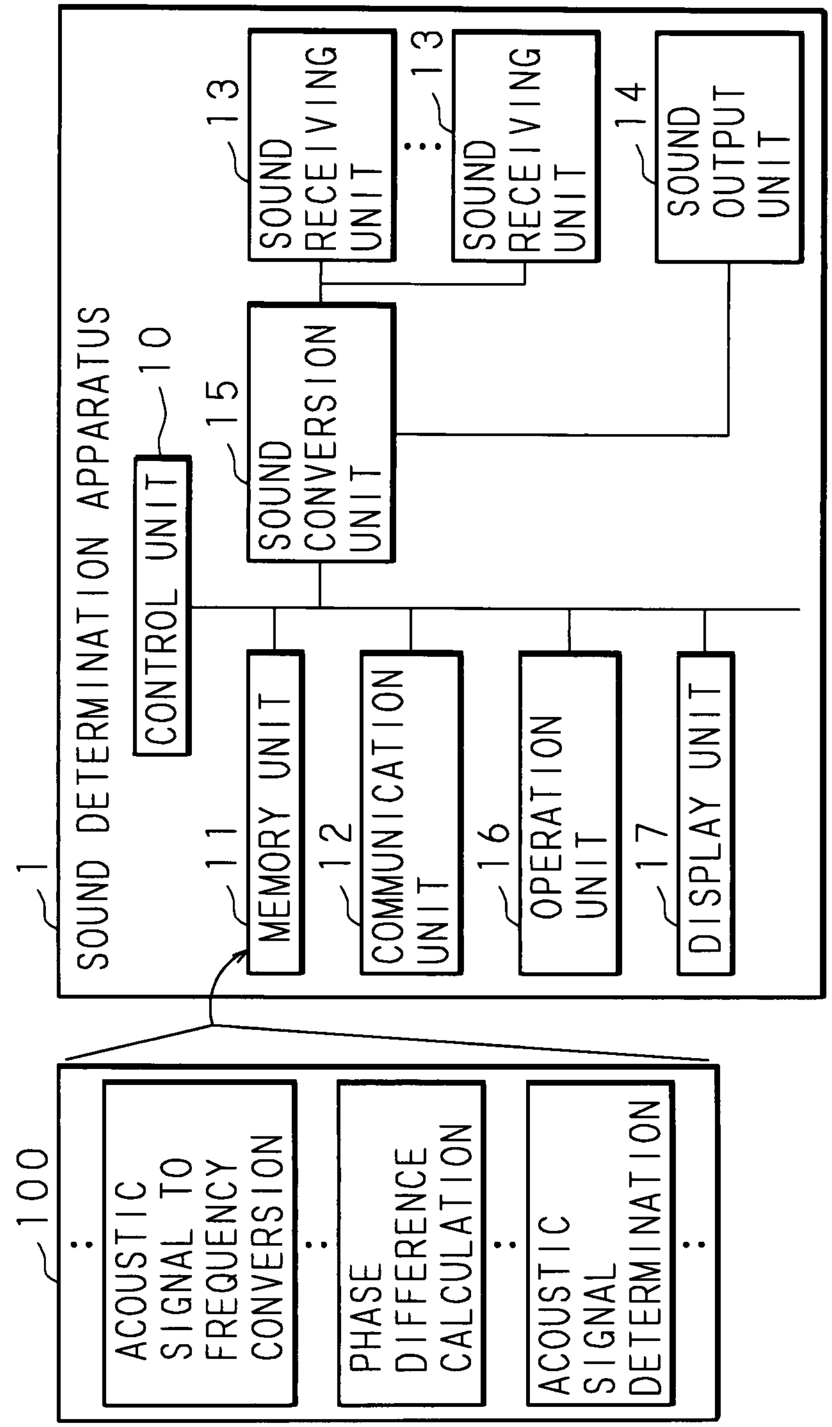
FIG. 2 is a block diagram showing the construction of the hardware of the sound determination apparatus of the first embodiment.

FIG. 2 is a block diagram showing an example of the construction of the hardware of the sound determination apparatus 1 of the first embodiment. The sound determination apparatus 1 comprises: a control unit 10 such as a CPU which controls the overall apparatus; a memory unit 11 such as ROM, RAM that stores data such as programs like a computer program and various setting values; and a communication unit 12 such as an antenna and accessories thereof which become the communication interface. Also, the sound determination apparatus 1 comprises: a plurality of sound receiving units 13, 13 such as microphones which receive acoustic signals; a sound output unit 14 such as a loud speaker; and a sound conversion unit 15 which performs conversion processing of the acoustic signal that is related to the sound receiving units 13, 13 and sound output unit 14. The conversion process that is performed by the sound conversion unit 15 is a process that converts the digital signal that is outputted from the sound output unit 14 to an analog signal, and a process that converts the acoustic signals that are received from the sound receiving units 13, 13 from analog signals to digital signals. Furthermore, the sound determination apparatus 1 comprises: an operation unit 16 which receives operation controls such as alphanumeric text or various commands that are inputted by key input; and a display unit 17 such as a liquid-crystal display which displays various information. Also by executing various steps included in a computer program 100 by the control unit 10, a mobile telephone operates as the sound determination apparatus 1.

Figure 3:
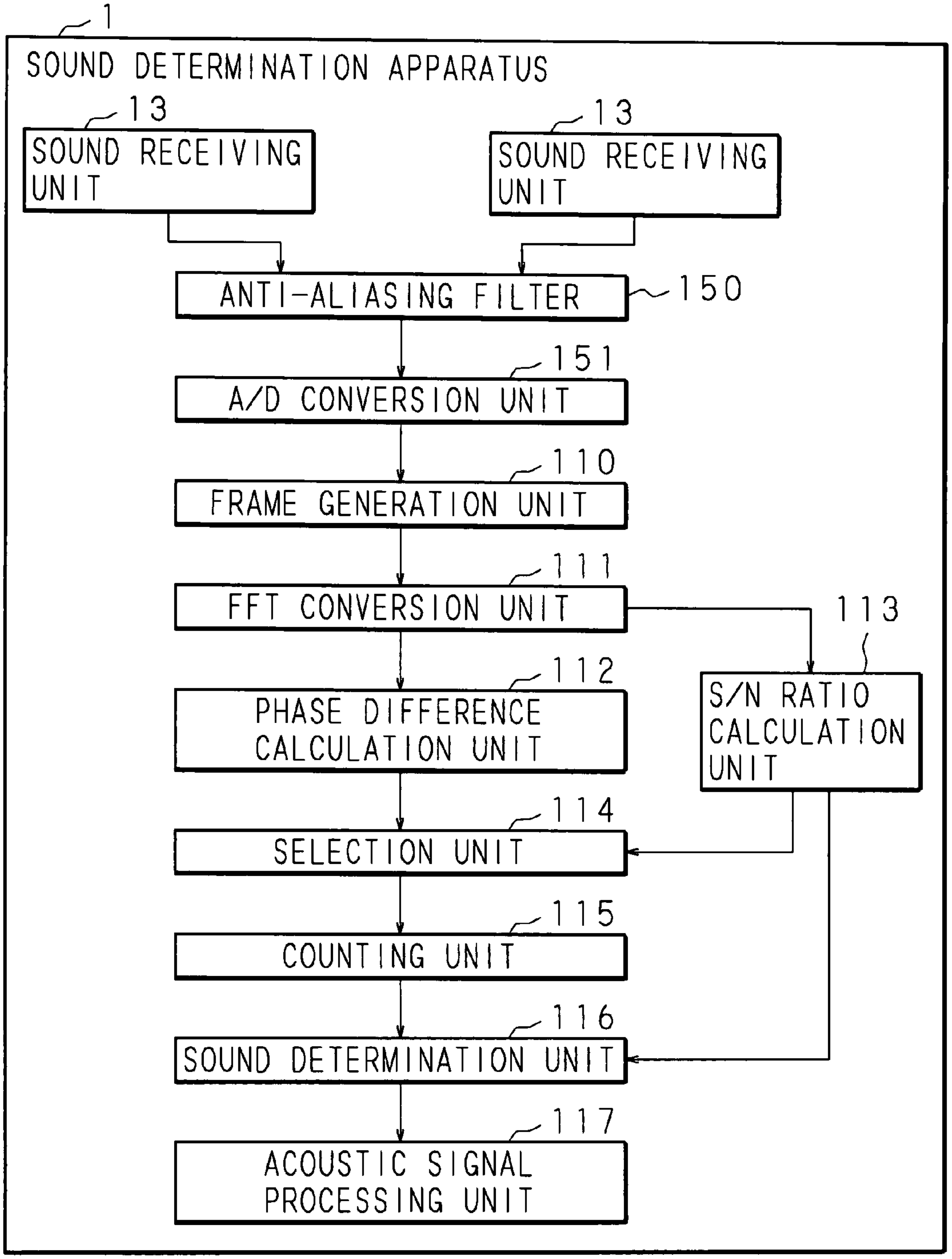
FIG. 3 is a block diagram showing an example of the functions of the sound determination apparatus of the first embodiment.

FIG. 3 is a block diagram showing an example of the functions of the sound determination apparatus 1 of the first embodiment. The sound determination apparatus 1 comprises: a plurality of sound receiving units 13, 13; an anti-aliasing filter 150 which functions as a LPF (Low Pass Filter) which prevents aliasing error when the analog acoustic signal is converted to a digital signal; and an A/D conversion unit 151 which performs A/D conversion of an analog acoustic signal to a digital signal. The anti-aliasing filter 150 and A/D conversion unit 151 are functions that are implemented in the sound conversion unit 15. The anti-aliasing filter 150 and A/D conversion unit 151 may also be mounted in an external sound pickup device and not included in the sound determination apparatus 1 as a sound conversion unit 15.

Furthermore, the sound determination apparatus 1 comprises: a frame generation unit 110 which generates frames having a predetermined time length from a digital signal that becomes the unit of processing; a FFT conversion unit 111 which uses FFT (Fast Fourier Transformation) processing to convert an acoustic signal to a signal on a frequency axis; a phase difference calculation unit 112 which calculates the phase difference between acoustic signals that are received by a plurality of sound receiving unit 13, 13; a S/N ratio calculation unit 113 which calculates the S/N ratio of an acoustic signal; a selection unit 114 which selects frequencies to be intended for processing; a counting unit 115 which counts the frequencies having a large phase difference; a sound determination unit 116 which identifies the acoustic signal coming from the target nearest sound source; and an acoustic signal processing unit 117 which performs processing such as noise suppression based on the identified acoustic signal. The frame generation unit 110, FFT conversion unit 111, phase difference calculation unit 112, selection unit 114, counting unit 115, sound determination unit 116 and acoustic processing unit 117 are software functions that are realized by executing various computer programs that are stored in the memory unit 11, however, they can also be realized by using special hardware such as various processing chips.

Figure 4:
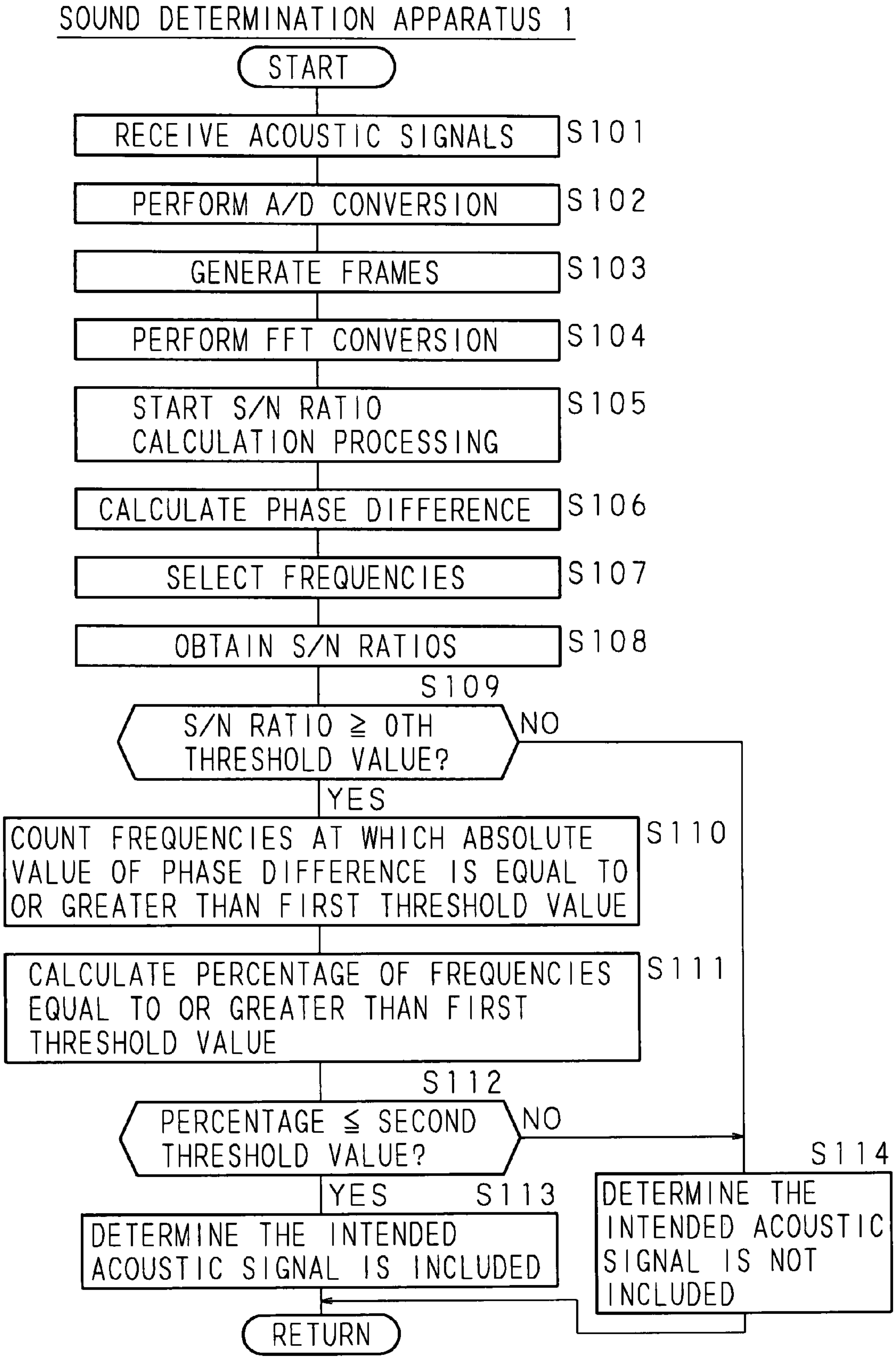
FIG. 4 is a flowchart showing an example of the sound determination process performed by the sound determination apparatus of the first embodiment.

Next, the processing by the sound determination apparatus 1 of the first embodiment will be explained. In the explanation below, the sound determination apparatus 1 is explained as comprising two sound receiving units 13, 13. However, the sound receiving units 13 are not limited to two, and it is possible to mount three or more sound receiving units 13, 13. FIG. 4 is a flowchart showing an example of the sound determination process that is performed by the sound determination apparatus 1 of the first embodiment. The sound determination apparatus 1 receives acoustic signals by way of the plurality of sound receiving units 13, 13 according to control from the control unit 10 which executes the computer program 100 (S101), then filters the signals by the anti-aliasing filter 150, which is a LPF, samples the acoustic signals that are received as analog signals at a frequency of 8000 Hz and converts the signals to digital signals (S102).

Also, the sound determination apparatus 1 generates frames having predetermined time lengths from the acoustic signals that have been converted to digital signals according to a process by the frame generation unit 110 based on control from the control unit 10 (S103). In step S103, acoustic signals are put into frames in units of a predetermined time length of about 20 ms to 40 ms. Each frame has an overrun of about 10 ms to 20 ms each. Also, typical frame processing in the field of speech recognition such as windowing using window functions such as a Hamming window or Hanning window, and a pre-emphasis filter is performed for each frame. The following processing is performed for each frame that is generated in this way.

The sound determination apparatus 1 performs FFT processing of the acoustic signals in frame units via processing by the FFT conversion unit 111 based on control from the control unit 10, and converts the acoustic signals to phase spectra and amplitude spectra, which are signals on a frequency axis (S104), and then starts the S/N calculation process to calculate the S/N ratio (signal to noise ratio) based on the amplitude component of the acoustic signals in frame units that have been converted to signals on the frequency axis (S105), and calculates the difference between the phase spectrums of the respective acoustic signals as the phase difference via processing by the phase difference calculation unit 112 (S106). In step S104, FFT is performed on 256 acoustic signal samples, for example, and the differences between the phase spectrum values for 128 frequencies are calculated as the phase differences. The S/N ratio calculation process that is started in step S105 is executed at the same time as the processing of step S106 or later. The S/N ratio calculation process is explained in detail later.

Also, the sound determination apparatus 1 selects frequencies from among all the frequencies that are intended fo processing via processing by the selection unit 114 based on control from the control unit 10 (S107). In step S107, frequencies at which it is easy to detect the acoustic signal coming from the target nearest sound source and at which it is difficult to receive the adverse affect of external disturbance such as ambient noise are selected. More specifically, frequency bands at which the phase difference is easily disturbed by the influence of the anti-aliasing filter 150 are eliminated. The frequency bands to be eliminated differ depending on the characteristics of the A/D conversion unit 151, however, typically, the phase difference becomes easily disturbed at a high frequency of 3300 to 3500 kHz or greater, so frequencies greater than 3300 Hz are precluded from targets for processing. Also, the S/N ratios for each frequency that are calculated by the S/N ratio calculation process are obtained, and in the order of the lowest S/N ratios that are obtained, a predetermined number of frequencies or frequencies equal to or less than a preset threshold value are precluded from the target for processing. It is also possible to obtain S/N ratios that are calculated for each frame, and instead of determining the frequencies to eliminate, set frequencies at which the S/N ratios become low beforehand as frequencies to eliminate. From the processing of step S107, the number of frequencies indented for processing is narrowed down to 100 for example.

The sound determination apparatus 1 obtains S/N ratios that are calculated by the S/N ratio calculation process via processing by the sound determination unit 116 based on control from the control unit 10 (S108), and determines whether or not the obtained S/N ratios are equal to or greater than a preset 0th threshold value (S109). A value such as 5 dB, for example, can be used as the 0th threshold value. In step S109, when a S/N ratio is equal to or greater than the 0th threshold value, it is determined that there is a possibility that the intended acoustic signal coming from the nearest sound source can be included, and when a S/N ratio is less than the 0th threshold value, it is determined that the intended acoustic signal is not included.

In step S109, when it is determined that the S/N ratio is equal to or greater than the 0th threshold value (S109: YES), the sound determination apparatus 1 counts the frequencies for which the absolute values of the phase differences that are selected in step S107 that are equal to or greater than a preset first threshold value via processing by the counting unit 115 based on control from the control unit 10 (S110). The sound determination apparatus 1 calculates the percentage of selected frequencies that are greater than the first threshold value based on the counting result via processing by the sound determination unit 116 based on control from the control unit 10 (S111), and determines whether or not the calculated percentage is equal to or less than a preset second threshold value (S112). A value such as π/2 radian, for example, is used as the first threshold value, and a value such as 3%, for example, is used as the second threshold value. In the case where 100 frequencies where selected, it is determined whether or not there are 3 or less frequencies having a phase difference of π/2 radian or greater.

In step S112, when the calculated percentage is less than the preset second threshold (S112: YES), the sound determination apparatus 1 determines via processing by the sound determination unit 116 based on control from the control unit 10 that an acoustic signal coming from the nearest sound source due to a direct sound having a small phase difference is included in that frame (S113). Also, the acoustic signal processing unit 117 executes various acoustic signal processing and sound output processing based on the determination result of step S113.

In step S109, when it is determined that the S/N ratio is less than the 0th threshold value (S109: NO), or in step S112, when it is determined that the calculated percentage is greater than the preset second threshold value (S112: NO), the sound determination apparatus 1 determines via processing by the sound determination unit 116 based on control from the control unit 10 that an acoustic signal coming from the nearest sound source is not included in that frame (S114). Also, the acoustic signal processing unit 117 executes various acoustic processing and sound output processing based on the determination result of step S113. The sound determination apparatus 1 repeatedly executes the series of processes described above until receiving the acoustic signal by the sound receiving unit 13, 13 is finished.

In the example of the sound determination process described above, the sound determination apparatus 1 calculates in step S111 the percentage of selected frequencies that are equal to or greater than the first threshold value based on the counting result, and in step S112, compares the calculated percentage with the second threshold value that indicates a preset percentage, however, in step S112, it is also possible to compare the number of frequencies calculated in step S110 that are equal to or greater than the first threshold with a number that is the second threshold value. When a number of frequencies is taken to be the second threshold value, the second threshold value is not a constant number, but becomes a variable that changes based on the frequencies that are selected in step S107.

For example, as a reference value, when the number of frequencies selected in step S107 is 128, the second threshold value is set so that it becomes 5 frequencies. With this as a condition, then in step S107 when 28 of 128 frequencies are eliminated and the number of frequencies is narrowed down to 100, then as shown by Equation 1 below, the second threshold value becomes 4.

$$5\times100/128=3.906\approx4 \quad \text{Equation 1}$$

Also, under the same condition, in step S107, when 56 frequencies are eliminated from the 128 frequencies, and the number of frequencies is narrowed down to 72, then as shown in Equation 2 below, the second threshold value becomes 3.

$$5\times72/128=2.813\approx3 \quad \text{Equation 2}$$

When a number of frequencies is used as the second threshold value in this way, then after the frequencies are selected in step S107, processing is performed to calculate the second threshold value based on the number of selected frequencies.

Figure 5:
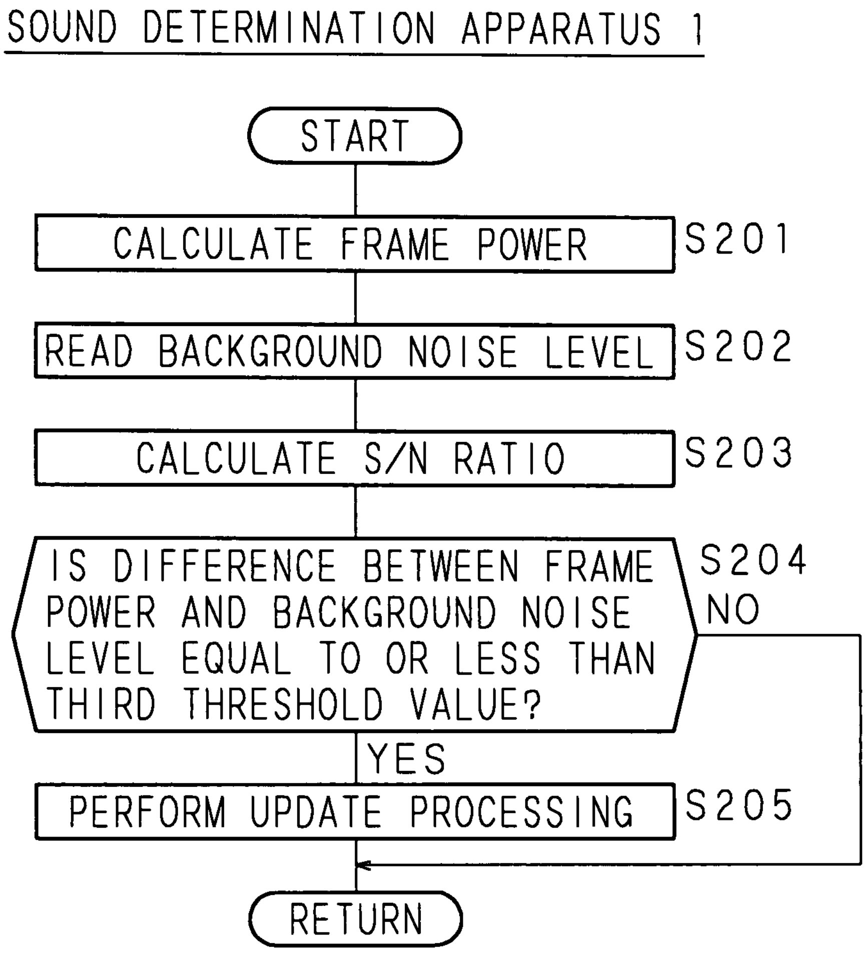
FIG. 5 is a flowchart showing an example of the S/N ratio calculation process performed by the sound determination apparatus of the first embodiment.

FIG. 5 is a flowchart showing an example of the S/N ratio calculation process performed by the sound determination apparatus 1 of the first embodiment. The S/N ratio calculation process is performed at the sound determination process (S105) described using FIG. 4. The sound determination apparatus 1 calculates the sum of squares of the amplitude value of the frame samples that is the target of S/N ratio calculation as the frame power via processing by the S/N calculation unit 113 based on control from the control unit 10 (S201), then reads a preset background noise level (S202) and calculates the S/N ratio (signal to noise ratio) of that frame, which is the ratio of the calculated frame power and the read background noise level (S203). When it is necessary to determine frequencies to be eliminated via processing by the selection unit 114 based on the S/N ratio for each frequency, then not just the S/N ratio of the whole frequency band, but the S/N ratios for each frequency are calculated. The background noise spectrum that indicates the level of background noise for each frequency is used to calculate the S/N ratios for each frequency as the ratio of the amplitude spectrum of a frame and the background noise spectrum.

Also, the sound determination apparatus 1 compares the frame power and background noise level via processing by the S/N ratio calculation unit 113 based on control from the control unit 10, and determines whether or not the difference between the frame power and background noise level is equal to or less than a predetermined third threshold value (S204), and when it is determined to be equal to or less than the third threshold value (S204: YES), updates the value of the background noise level using the value of the frame power (S205). In step S204, when the difference between the frame power and background noise level is equal to or less than the third threshold value, the difference between the frame power and background noise level is deemed to be due to a change in the background noise level, so in step S205 the background noise level is updated using the most recent frame power. In step 205, the value of the background noise level is updated to a value that is calculated by combining the background noise level and frame power at a constant ratio. For example, the updated value is taken to be a sum of the value that is 0.9 times the original background noise level and the value that is 0.1 times the current frame power.

In step S204, when it is determined that the difference between the frame power and the background noise level is greater than the third threshold value (S204: NO), the update process of step S205 is not performed. In other words, when the difference between the frame power and the background noise level is greater than the third threshold value, the difference between the frame power and the background noise level is deemed to be due to receiving an acoustic signal that differs from the ambient noise. The background noise level can be estimated by employing various methods that are used in fields such as speech recognition, VAD (Voice Activity Detection), microphone array processing, and the like. The sound determination apparatus 1 repeatedly executes the series of processes described above until receiving of the acoustic signals by the sound receiving units 13, 13 is finished.

Figure 6:
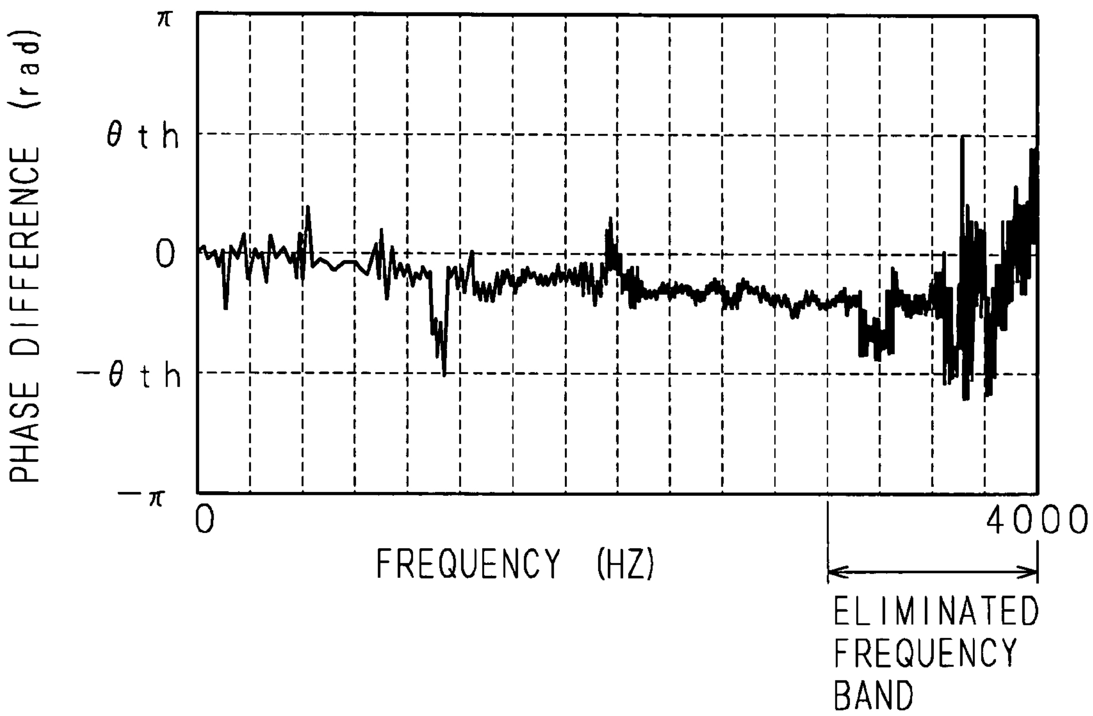
FIG. 6 is a graph showing an example of the relationship between the frequency and phase difference in the sound determination process by the sound determination apparatus of the first embodiment.

FIG. 6 is a graph showing an example of the relationship between the frequency and phase difference in the sound determination process by the sound determination apparatus 1 of the first embodiment. FIG. 6 is a graph that shows the phase difference for each frequency that is calculated by the sound determination process, and shows the relationship thereof with the frequency shown along the horizontal axis and the phase difference shown along the vertical axis. The frequency range shown in the graph is 0 to 4000 Hz, and the phase difference range is $-\pi$ to $+\pi$ radian. Also, in FIG. 6, the value shown as $+\theta th$ and $-\theta th$ is the first threshold value that is explained in the explanation of the sound determination process. In the explanation of the sound determination process, whether or not the absolute value of the phase difference is equal to or greater than the first threshold value is determined, and since the value of the phase difference can be a negative value, the first threshold value is also set to a positive and negative value. The acoustic signals that are received by the sound receiving units 13, 13 from a nearby sound source are mainly direct sound, so the phase difference is small and there is little discontinuous phase disturbance, however, ambient noise that includes non-stationary noise arrives at the sound receiving units 13, 13 from various long distance sound sources and various paths such as reflected sound and diffracted sound, so the phase difference becomes large and discontinuous phase disturbance increases. On the high frequency side of FIG. 6 the phase difference is large, and discontinuous phase differences are observed, however, this is due to the effect of the anti-aliasing filter 150. In the example shown in FIG. 6, in the sound determination process, frequency bands equal to or greater than 3300 Hz are eliminated by the processing of the selection unit 114, and since there is only one frequency for which the absolute value of the phase difference is equal to or greater than the first threshold value, it is determined that an acoustic signal coming from the nearest sound source due to direct sound is included.

Figure 7:
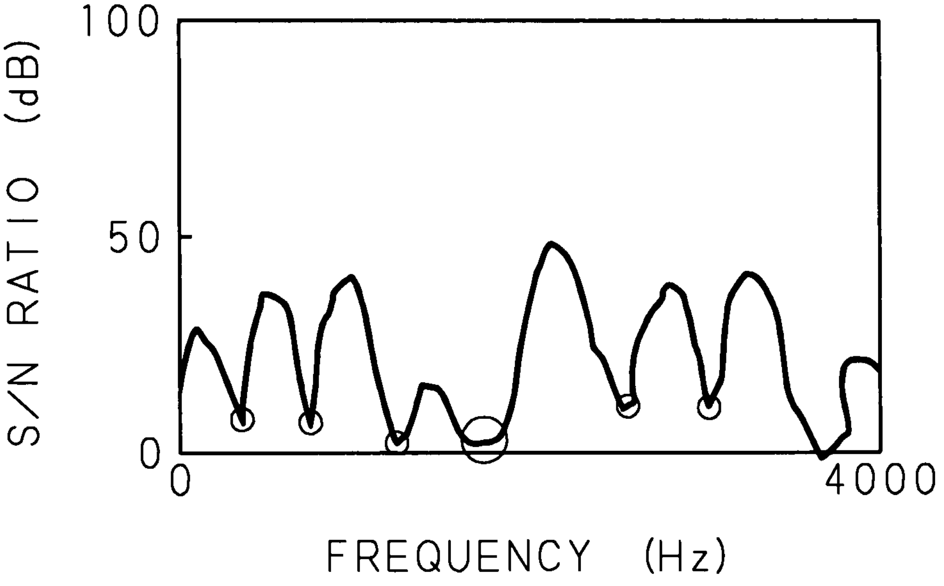
FIG. 7 is a graph showing an example of the relationship between the frequency and S/N ratio in the sound determination process by the sound determination apparatus of the first embodiment.

FIG. 7 is a graph showing an example of the relationship between the frequency and the S/N ratio in the sound determination process by the sound determination apparatus 1 of the first embodiment. FIG. 7 is a graph that shows the S/N ratio for each frequency that is calculated in the S/N ratio calculation process, and shows the frequency along the horizontal axis, and shows the S/N ratio along the vertical axis. The frequency range shown in the graph is 0 to 4000 Hz, and the S/N ratio range is 0 to 100 dB. In the sound determination process, determination of the acoustic signal is performed by eliminating frequency bands having low S/N ratios that are indicated by the round marks in FIG. 7 in the processing of the selection unit 114.

Figure 8:
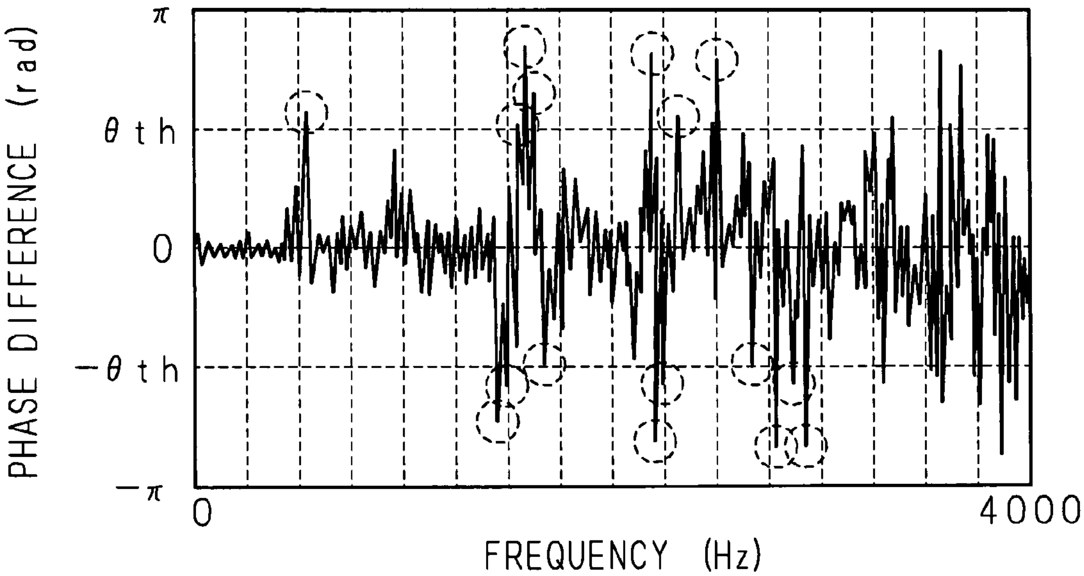
FIG. 8 is a graph showing an example of the relationship between the frequency and phase difference in the sound determination process by the sound determination apparatus of the first embodiment.

FIG. 8 is a graph showing an example of the relationship between the frequency and phase difference in the sound determination process by the sound determination apparatus 1 of the first embodiment. The method of notation in the graph shown in FIG. 8 is the same as that of FIG. 6. In FIG. 8, in the sound determination process, selected frequencies for which the absolute value of the phase difference is equal to or greater than the first threshold value $\theta th$ are indicated by round dots, and it is determined whether or not the percentage or the number of frequencies indicated by round dots is equal to or less than the second threshold value. For example, when the second threshold value is set to 3 frequencies, then in the example shown in FIG. 8, it is determined that an acoustic signal coming from the nearest sound source is not included.

In the first embodiment, the case in which the sound determination apparatus is a mobile telephone is explained, however, the invention is not limited to this, and the sound determination apparatus can be a general-purpose computer which comprises a sound receiving unit, and the sound receiving unit does not necessarily need to be placed and secured inside the sound determination apparatus, and the sound receiving unit can be of various forms such as an external microphone which is connected by a wired or wireless connection.

Moreover, in the first embodiment, the case is explained in which when the S/N ratio is low, the following sound determination is not performed, however, the invention is not limited to this, and various forms are possible such as determining whether or not an acoustic signal coming from the nearest sound source is included for each frame based on phase difference regardless of the S/N ratio.

Second Embodiment

The second embodiment is a form that limits the intended acoustic signal coming from the sound source in the first embodiment to a human voice. The sound determination method, as well as the construction and function of the sound determination apparatus of the second embodiment are the same as those of the first embodiment, so an explanation of them can be found by referencing the first embodiment, and a detailed explanation of them is omitted here. In the explanation below, the same reference numbers are given to components that are the same as those of the first embodiment.

Figure 9A:
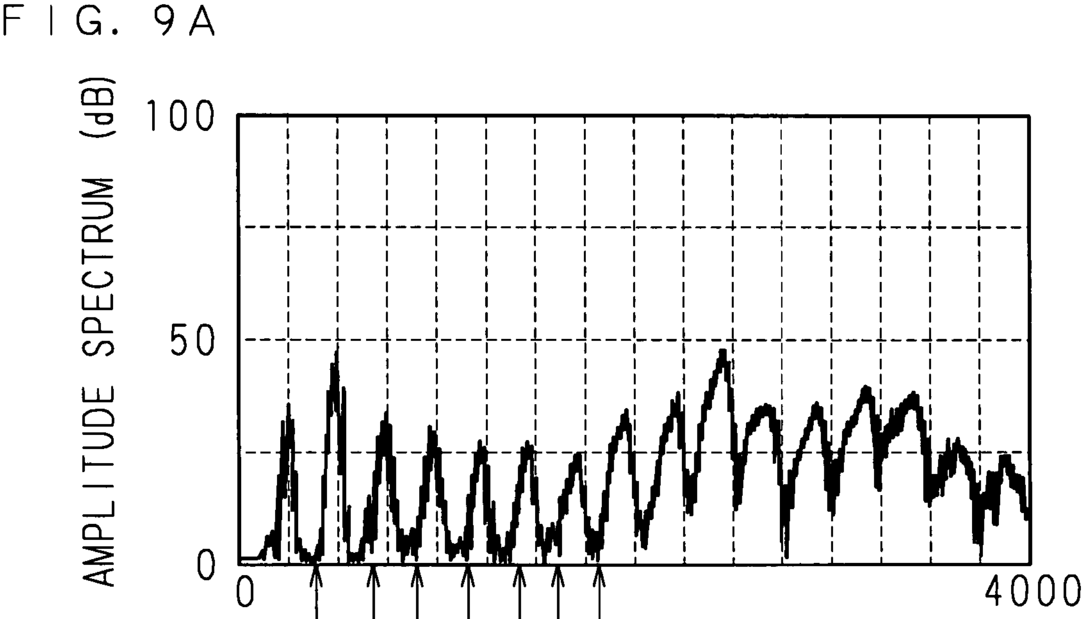
FIGS. 9A, 9B are graphs showing an example of the sound characteristics in the sound determination method of a second embodiment.
Figure 9B:
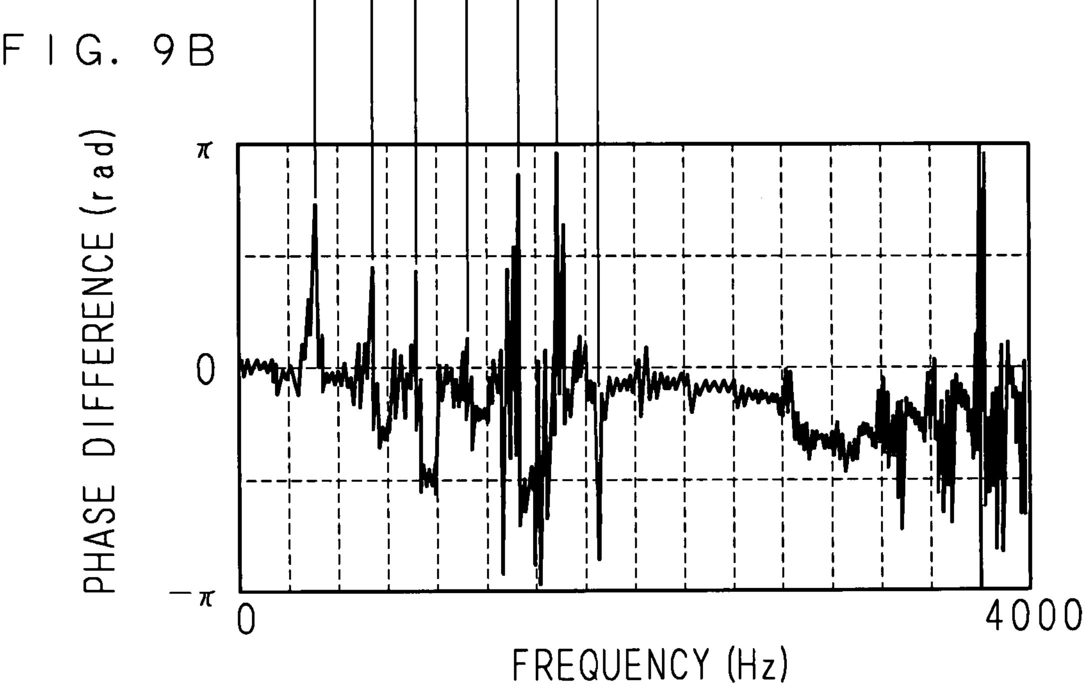

In the second embodiment, further selection conditions according to the voice characteristics are added to selection by the selection unit 114 in the sound determination process of the first embodiment. FIGS. 9A, 9B are graphs showing an example of the voice characteristics used in the sound determination method of the second embodiment. FIGS. 9A, 9B show the characteristics of a female voice, where FIG. 9A shows the value of the amplitude spectrum for each frequency based on the frequency conversion process, with the frequency shown along the horizontal axis and the amplitude spectrum along the vertical axis, and is a graph showing the relationship thereof. The frequency range shown in the graph is 0 to 4000 Hz. FIG. 9B shows the phase difference for each frequency that is calculated in the sound determination process, with the frequency along the horizontal axis and the phase difference along the vertical axis, and is a graph showing the relationship thereof. The frequency range shown in the graph is 0 to 4000 Hz, and the phase difference range is $-\pi$ to $+\pi$ radian. As can be clearly seen from comparing FIG. 9A and FIG. 9B, at frequencies where the amplitude spectrum has a local minimum value, the phase difference becomes large. The same result is obtained when using the value of the S/N ratio instead of the amplitude spectrum. Therefore, when the sound determination apparatus 1 selects frequencies by way of the selection unit 114, by eliminating frequencies at which the S/N ratio or amplitude spectrum has a local minimum value, it is possible to improve the accuracy of determination.

Figure 10:
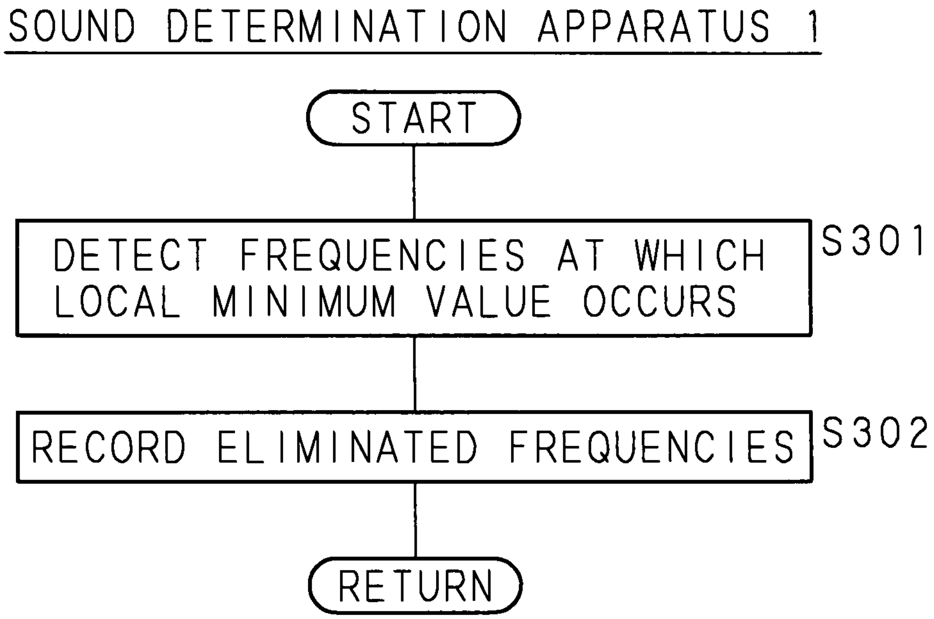
FIG. 10 is a flowchart showing an example of the local minimum value detection process performed by the sound determination apparatus of the second embodiment.

FIG. 10 is a flowchart showing an example of the local minimum value detection process by the sound determination apparatus 1 of the second embodiment. As a process to detect the local minimum values as explained above using FIGS. 9A, 9B, the sound determination apparatus 1 detects frequencies at which the S/N ratio or amplitude spectrum of acoustic signals converted to signals on the frequency axis has a local minimum value according to control from the control unit 10 that executes a computer program 100 (S301), and stores the information of the frequencies of the detected local minimum values and the nearby frequency bands of those frequencies as frequencies to be eliminated (S302). The values calculated by the S/N ratio calculation process can be used as the values of the S/N ratios and amplitude spectrum of acoustic signals. The detection in step S301 compares the S/N ratio that is the intended frequency for determination with the S/N ratios of the previous and following frequencies, and when a S/N ratio is less than the S/N ratios of the previous and following frequencies, that frequency is detected as being a frequency at which the S/N ratio is a local minimum value. By handling the average value of the S/N ratios of the nearby frequencies that include the target frequency as the S/N ratio of the target frequency, it is possible to eliminate minute changes and detect the local minimum value with good accuracy. Also, the local minimum value can be detected based on changes from the previous and following S/N ratios.

Figure 11:
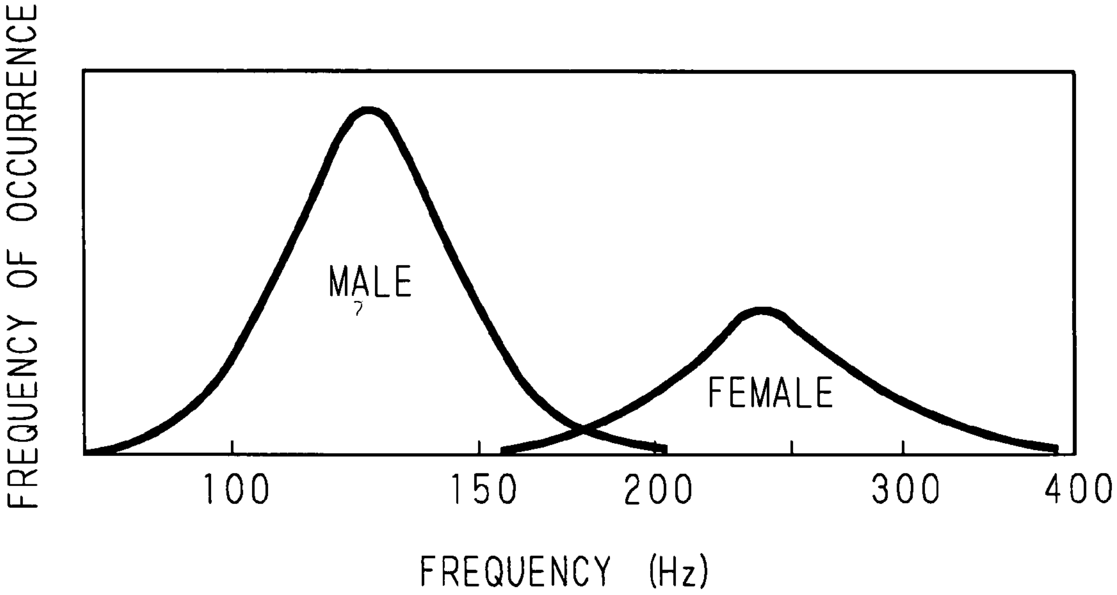
FIG. 11 is a graph showing the fundamental frequency characteristics of a voice in the sound determination method of the second embodiment.

FIG. 11 is a graph showing the characteristics of the fundamental frequencies of a voice in the sound determination method of the second embodiment. FIG. 11 is a graph that shows the distribution of fundamental frequencies for female and male voices (for example, refer to "Digital Voice Processing", Sadaoki Furui, Tokai University Press, September 1985, p. 18), with the frequency shown along the horizontal axis, and the frequency of occurrence shown along the vertical axis. The fundamental frequency indicates the lower limit of the voice spectrum, so there is no voice spectrum component at frequencies lower than this frequency. As can be clearly seen from the frequency distributions for voices shown in FIG. 11, most of the voice sound is included in the frequency band greater than 80 Hz. Therefore, when the sound determination apparatus 1 selects frequencies by way of the selection unit 114, by eliminating frequencies of 80 Hz or less, for example, it is possible to improve the accuracy of determination.

As is explained using FIGS. 9A, 9B, 10 and 11, when the acoustic sound coming from the target sound source is limited to a human voice, in the sound determination process, as the method of selection by way of the selection unit 114 of the frequencies to be the intended frequencies for processing from among all frequencies, the sound determination apparatus 1 eliminates frequencies that are detected and stored in the local minimum value detection process as frequencies to be eliminated and eliminates frequencies of the low frequency band where the fundamental frequency does not exist. By doing so, it becomes possible to improve the accuracy of determination.

Third Embodiment

The third embodiment is a form in which the relative position of the sound receiving units in the first embodiment can be changed. The sound determination method, as well as the construction and function of the sound determination apparatus of the third embodiment are the same as those of the first embodiment, so an explanation of them can be found by referencing the first embodiment, and a detailed explanation of them is omitted here. However, the relative position of the respective sound receiving units can be changed such as in the case of external microphones that are connected to the sound determination apparatus by a wired connection, for example. In the explanation below, the same reference numbers are given to components that are the same as those of the first embodiment.

In the case of the acoustic velocity V (m/s), the distance (width) between sound receiving units 13, 13 W (m), and the sampling frequency F (Hz), it is preferred that the relationship between the first threshold value θth (radian) and the incident angle to the sound receiving units 13, 13ϕ (radian), be as given by Equation 3 below of the Nyquist frequency.

$$\theta th = W \cdot \sin\phi \sim F \cdot 2\pi / 2V \qquad \text{Equation 3}$$

For example, when there is change from the state of V=340 m/s, W=0.025 m, F=8000 Hz, θth=½π radian to W=0.030 m, it is possible to optimize the first threshold by also changing the first threshold θth to the value calculated in Equation 4 below.

$$\theta th = (0.03 \times 0.85 \times 8000 \times 2\pi)/(340 \times 2) = 3/5\pi \qquad \text{Equation 4}$$

When the sampling frequency is 8000 Hz and the acoustic velocity is 340 m/s, it is preferred that the value of the upper limit for the distance between sound receiving units 13, 13 be 340/8000=0.0425 m=4.25 cm, and when the distance becomes greater than this, adverse effects due to sidelobe occurs. Also, from testing it is found that it is preferred that the value of the lower limit be 1.6 cm, and when the distance becomes less than this, it becomes difficult to get the accurate phase difference, so effects due to error become large.

Figure 12:
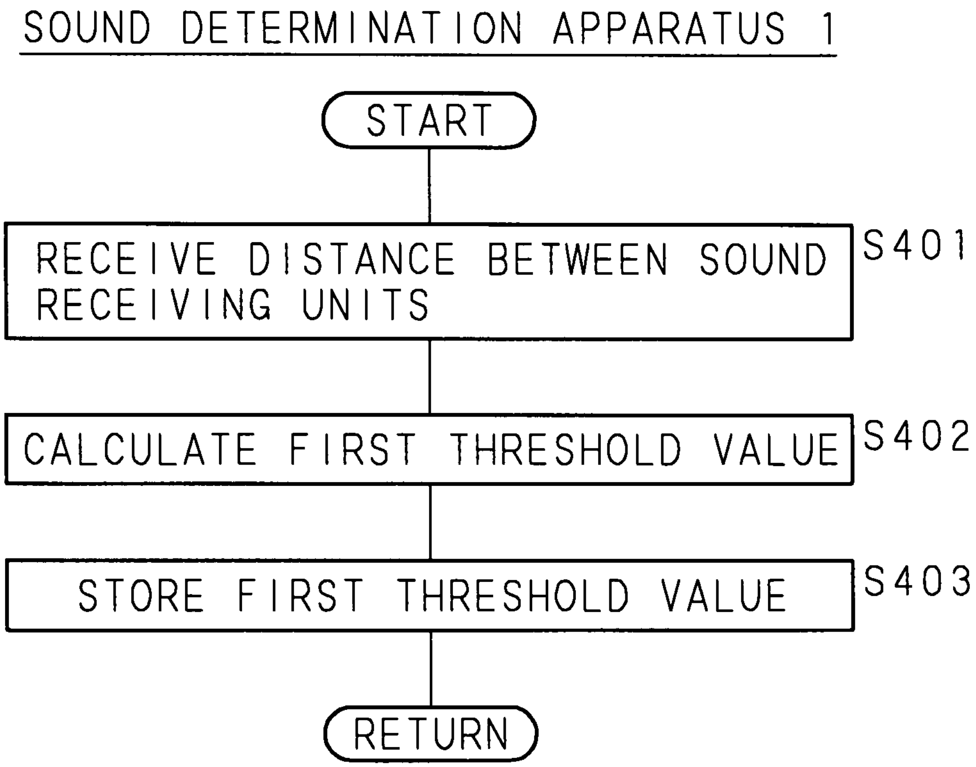
FIG. 12 is a flowchart showing an example of a first threshold value calculation process performed by the sound determination apparatus of a third embodiment.

FIG. 12 is a flowchart that shows an example of the first threshold value calculation process by the sound determination apparatus 1 of the third embodiment of the invention. The sound determination apparatus 1 receives the value of the width (distance) between the sound receiving units 13, 13 according to control from the control unit 10 that executes the computer program 100 (S401), then calculates the first threshold value based on that received distance (S402), and stores the calculated first threshold value as the set value (S403). The distance received in step S401 can be a value that is manually inputted, or can be a value that is automatically detected. Various processes, such as the sound determination process, are executed based on the first threshold value that is set in this way.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A sound processing method for processing analog acoustic signals received by a plurality of sound receiving units from a plurality of sound sources, said sound processing method comprising steps of:

receiving analog acoustic signals by the plurality of sound receiving units from the plurality of sound sources;

converting respective analog acoustic signals received by the respective sound receiving units to digital signals;

generating frames having a predetermined time length from the respective acoustic signals that have been converted to digital signals;

converting the respective acoustic signals in units of the generated frames into signals on a frequency axis;

calculating a difference in phase components at each frequency between the respective acoustic signals that are converted to signals on the frequency axis as a phase difference;

determining that an analog acoustic signal received by the sound receiving unit coming from the nearest sound source is included in the generated frame when a percentage or number of frequencies for which the calculated phase difference is equal to or greater than a first threshold value is equal to or less than a second threshold value;

determining the frame including the acoustic signal from the nearest sound source based on a result of the determination; and performing the processing for the determined frame.

2. A sound processing apparatus which processes analog acoustic signals received by a plurality of sound receiving units from a plurality of sound sources, said sound processing apparatus comprising:

a plurality of sound receiving units which receive analog acoustic signals from a plurality of sound sources;

a first conversion unit which converts respective analog acoustic signals received by the respective sound receiving units to digital signals;

a frame generation unit which generates frames having a predetermined time length from the respective acoustic signals that have been converted to digital signals;

a second conversion unit which converts the respective acoustic signals in units of the generated frames into signals on a frequency axis;

a phase difference calculation unit which calculates a difference in the phase component at each frequency between the respective acoustic signals that are converted to signals on the frequency axis as a phase difference;

a determination unit which determines that a specified target acoustic signal is included in the generated frame when a percentage or number of frequencies for which the calculated phase difference is equal to or greater than a first threshold value is equal to or less than a second threshold value;

a unit which determines the frame including the specified target acoustic signal based on a determination result of the determining unit; and a processing unit performs the processing for the determined frame.

3. The sound processing apparatus of claim 2, further comprising:

a S/N ratio calculation unit which calculates a signal to noise ratio on the basis of the amplitude component of the acoustic signals that are convened to signals on the frequency axis; wherein said determination unit determines that the specified target acoustic signal is not included regardless of the phase difference when the calculated signal to noise ratio is equal to or less than a predetermined threshold value.

4. The sound processing apparatus of claim 2, wherein said plurality of sound receiving units are constructed so that the relative position between them can be changed; and further comprising:

a threshold value calculation unit which calculates the threshold value to be used in the determination by said determination unit on the basis of the distance between said plurality of sound receiving units.

5. The sound processing apparatus of claim 2, further comprising:

a selection unit which selects frequencies to be used in the determination by said determination unit on the basis of the signal to noise ratio at each frequency that is based on the amplitude component of the acoustic signals that are converted to signals on the frequency axis.

6. The sound processing apparatus of claim 2, further comprising:

an anti-aliasing filter which filters out acoustic signals before conversion to digital signals in order to prevent aliasing error; wherein said determination unit eliminates frequencies that are higher than a predetermined frequency that is based on the characteristics of said anti-aliasing filter from the frequencies to be used in determination.

7. The sound processing apparatus of claim 2, further comprising:

a detection unit which, when specifying an acoustic signal that is a voice, detects the frequencies at which the amplitude component of the acoustic signals that are converted to signals on the frequency axis have a local minimum value, or the frequencies at which the signal to noise ratios based on the amplitude component have a local minimum value;

wherein said determination unit eliminates the detected frequencies from the frequencies to be used in determination.

8. The sound processing apparatus of claim 2, wherein when specifying an acoustic signal that is a voice, said determination unit eliminates frequencies at which the fundamental frequency for voice; does not exist from the frequencies to be used in determination.

9. A sound processing apparatus which processes analog acoustic signals received by a plurality of sound receiving units from a plurality of sound sources, said sound processing apparatus comprising:

a plurality of sound receiving units which receive analog acoustic signals from a plurality of sound sources;

a first conversion unit which converts respective analog acoustic signals received by the respective sound receiving units to digital signals;

a frame generation unit which generates frames having a predetermined time length from the respective acoustic signals that are converted to digital signals;

a second conversion unit which converts the respective acoustic signals in units of the generated frames into signals on a frequency axis;

a phase difference calculation unit which calculates a difference in the phase component at each frequency between the respective acoustic signals that are converted to signals on the frequency axis as a phase difference;

a determination unit which determines that an acoustic signal coming from the nearest sound source is included in a generated frame when the percentage or number of frequencies for which the calculated phase difference is equal to or greater than a first threshold value is equal to or less than a second threshold value;

a unit which determines the frame including the acoustic signal from the nearest sound source based on a determination result of the determining unit; and a processing unit which performs the processing for the determined frame.

10. The sound processing apparatus of claim 9, further comprising:

a S/N ratio calculation unit which calculates a signal to noise ratio on the basis of the amplitude component of the acoustic signals that are converted to signals on the frequency axis; wherein said determination unit determines that the specified target acoustic signal is not included regardless of the phase difference when the calculated signal to noise ratio is equal to or less than a predetermined threshold value.

11. The sound processing apparatus of claim 9, wherein said plurality of sound receiving units are constructed so that the relative position between them can be changed; and further comprising:

a threshold value calculation unit which calculates the threshold value to be used in the determination by said determination unit on the basis of the distance between said plurality of sound receiving units.

12. The sound processing apparatus of claim 9, further comprising:

a selection unit which selects frequencies to be used in the determination by said determination unit on the basis of the signal to noise ratio at each frequency that is based on the amplitude component of the acoustic signals that are converted to signals on the frequency axis.

13. The sound processing apparatus of claim 12, further comprising:

a second threshold value calculation unit which calculates the second threshold value on the basis of the number of frequencies that are selected by said selection unit when said determination unit performs determination on the basis of the number of frequencies at which the phase difference is equal to or greater than the first threshold value.

14. The sound processing apparatus of claim 9, further comprising:

an anti-aliasing filter which filters out acoustic signals before conversion to digital signals in order to prevent aliasing error; wherein said determination unit eliminates frequencies that are higher than a predetermined frequency that is based on the characteristics of said anti-aliasing filter from the frequencies to be used in determination.

15. The sound processing apparatus of claim 9, further comprising:

a detection unit which, when specifying an acoustic signal that is a voice, detects the frequencies at which the amplitude component of the acoustic signals that are converted to signals on the frequency axis have a local minimum value, or the frequencies at which the signal to noise ratios based on the amplitude component have a local minimum value;

wherein said determination unit eliminates the detected frequencies from the frequencies to be used in determination.

16. The sound processing apparatus of claim 9, wherein when specifying an acoustic signal that is a voice, said determination unit eliminates frequencies at which the fundamental frequency for voices does not exist from the frequencies to be used in determination.

17. A computer-readable memory product storing a computer program for causing a computer to perform processing of analog acoustic signals, said computer program comprising steps of:

receiving analog acoustic signals from a plurality of sound sources;

converting respective received analog acoustic signals to digital signals;

generating frames having a predetermined time length from the respective acoustic signals that have been converted to digital signals;

converting the respective converted digital signals in units of the generated frames into signals on a frequency axis;

calculating a phase difference in phase components at each frequency between the respective acoustic signals that are converted to signals on the frequency axis as a phase difference;

determining that an acoustic signal coming from the nearest sound source is included in the generated frame when a percentage or number of frequencies for which the calculated phase difference is equal to or greater than a first threshold value is equal to or less than a second threshold value;

determining the frame including the acoustic signal from the nearest sound source based on a result of the determination; and performing the processing for the determined frame.

* * * * *